United States Patent [19]

Perkins

[11] Patent Number: 4,576,730

[45] Date of Patent: Mar. 18, 1986

[54] METHOD AND COMPOSITION FOR CLEANING AND PROTECTING METAL

[75] Inventor: Earl Perkins, Columbia, Mo.

[73] Assignee: Touchstone Corporation, Columbia, Mo.

[21] Appl. No.: 712,865

[22] Filed: Mar. 18, 1985

[51] Int. Cl.[4] .................. C11D 7/20; C23F 9/00; C23F 13/00; C23G 1/16

[52] U.S. Cl. .................. 252/174.14; 106/14.21; 106/14.39; 106/89; 106/286.5; 106/286.6; 106/286.7; 134/2; 148/6; 252/160; 252/174.25

[58] Field of Search .............. 252/113, 116, 120, 123, 252/131, 140, 155, 160, 163, 166, 168, 174.25, 174.14; 106/100, 76, 89, 14.21, 14.39, 286.1, 286.5, 286.6, 286.7; 148/6; 134/2

[56] References Cited

U.S. PATENT DOCUMENTS

| | | | |
|---|---|---|---|
| 1,533,326 | 4/1925 | Marshall | 252/140 |
| 2,296,097 | 9/1942 | Emiley | 252/160 |
| 2,625,514 | 1/1953 | Kirschenbauer | 252/131 |
| 2,690,983 | 10/1954 | Meckler | 134/7 |
| 2,739,129 | 3/1956 | Manchot | 252/174.14 |
| 3,365,313 | 1/1968 | Roberts et al. | 106/14 |
| 3,677,796 | 7/1972 | Girard et al. | 427/419.6 |
| 3,944,499 | 3/1976 | Staniek | 252/167 |

OTHER PUBLICATIONS

Protective Coating for Titanium and Titanium Alloys, vol. 66, No. 118399c (1964) (Abstracting French Pat. No. 1,455,097).

Study of the Formation of Silicate-Nichrome Coatings, vol. 88, No. 174611g (1978).

Chromium Oxide Hydrate Film Formation, vol. 93, No. 140055s (1980).

*Primary Examiner*—Dennis L. Albrecht
*Attorney, Agent, or Firm*—Willian, Brinks, Olds, Hofer, Gilson & Lione, Ltd.

[57] ABSTRACT

Methods and compositions for cleaning and protecting metal are disclosed, particularly useful in cleaning chrome and chrome plated surfaces. The composition comprises 40 to 75% of compounds selected from the group of anhydrous oxides of metals in Group IIA of the periodic table, 12 to 30% silicon dioxide, 2 to 20% of compounds selected from the group of anhydrous aluminum and borate oxides, 0.25 to 10% of anhydrous carbonates or hydroxides of metals selected from Group IA of the periodic table and 0.5 to 3% of silicates of metals in Groups IA and IIA of the periodic table.

7 Claims, No Drawings

METHOD AND COMPOSITION FOR CLEANING AND PROTECTING METAL

BACKGROUND OF THE INVENTION

This invention relates to metal cleaning compositions in general, and particularly to chrome cleaning compositions and methods or processes for cleaning metal, especially chrome and stainless steel.

Chromium forms an oxide layer on its surface when it is exposed to air. The oxide layer is not visible and thus chrome plated surfaces remain bright for some time. More importantly, the oxide layer, unlike iron oxide (rust) is not porous. Thus the oxidized layer prevents corrosive materials from penetrating to the chromium or other metals beneath the oxide layer, protecting those materials from further oxidation. The chromium content in stainless steel provides the same protection against corrosion in that alloy.

Chrome plated surfaces do, however, become contaminated. Particularly items such as bathroom fixtures get contaminated with a scale of metal salts, such as calcium and magnesium carbonate. In addition, the protective chromium oxide layer may be physically broken or pitted, allowing underlying metals to oxidize and corrode.

Conventional chrome cleaning processes have generally used abrasive materials and high pH (alkaline) conditions to clean such contamination. Such cleaners typically are in a liquid, gel or cream form, and may include a wax which can be buffed after cleaning as further protection.

It has been known that a silicate bond on the surface of a metal will provide additional protection. Such a coating may provide a ceramic-like protection against alkali, acid and contamination. The silicate bonding processes of the prior art typically include rigorous environmental conditions, such as exposing the surface to heat and alkali, often under an inert atmosphere.

SUMMARY OF THE INVENTION

The present invention provides a powdered composition which allows for both a cleaning and silicate bonding of chrome surfaces in a simple, one step procedure, without the need for extraordinary environmental conditions. The composition comprises 40 to 75% of compounds selected from the group of anhydrous oxides of metals in Group IIA of the periodic table, 12 to 30% silicon dioxide, 2 to 20% of compounds selected from the group of anhydrous aluminum or borate oxides, 0.25 to 10% of anhydrous carbonates or hydroxides of metals selected from Group IA of the periodic table and 0.5 to 20% of silicates of metals in Group IA or IIA of the periodic table.

One procedure for using the composition comprises the steps of dampening the powdered composition with water and rubbing the dampened composition on the surface to be cleaned.

There are numerous advantages to the present invention. Primarily chrome and other metal surfaces can be treated in a single step for both cleaning and silicate bonding. The silicate bonding is performed simultaneously and without the need for harsh environmental conditions. The composition is in powdered form and is easily applied. The cleaned surface is left with a layer of silicate bonded to the chrome which provides long term protection against subsequent contamination.

DETAILED DESCRIPTION OF THE PRESENTLY PREFERRED EMBODIMENTS

The composition of the present invention comprises a combination of materials selected from five groups, labeled as groups A-E herein for ease of discussion. Perfumes or coloring agents may be added to make the composition of the present invention more aesthetically pleasing.

Group A comprises anhydrous oxides of metals in Group IIA of the periodic table, such as calcium oxide.

Group B comprises silicon dioxide ($SiO_2$).

Group C comprises anhydrous aluminum or borate oxides.

Group D comprises anhydrous carbonates or hydroxides of metals in Group IA of the periodic table, such as sodium bicarbonate.

Group E comprises silicates of metals in Groups IA or IIA of the periodic table.

The materials from each of groups A-E may be in a powder form before mixing, or made into a powder after being mixed to form the composition of the present invention. In addition, the compounds from groups A, B and C may be in the form of complex compounds containing compounds from more than one of the three groups, such as tricalcium aluminate ($3CaO.Al_2O_3$) and dicalcium silicate ($2CaO.SiO_2$). The compounds from group A, B and C may also be provided in complexes with other compounds which do not inhibit their activity in the final formulation, such as tetracalcium aluminoferrate ($4CaO.Al_2O_3.Fe_2O_3$).

The relative amounts of each component in the composition of the present invention is as follows (all percentages throughout the specification are in weight percent):

40 to 75% Group A
12 to 30% Group B
2 to 20% Group C
0.25 to 10% Group D
0.5 to 20% Group E The compounds for each of the groups may be found in readily available materials. For example, groups A, B and C are available in the required proportions in Type I Portland cement. Other types of Portland cement also include the compounds of groups A, B and C. Baking soda is a readily available source of sodium bicarbonate, a member of Group D. Talc is a magnesium silicate, a member of Group E.

Type I, the most commonly used type of Portland cement, has the following composition:

60–66% $CaO$
19–25% $SiO_2$
3–8% $Al_2O_3$
1–5% $Fe_2O_3$
0–5% $MgO$
1–3% $SO_3$

Many of the compounds in Portland cement are in the form of complexes, such as tetracalcuim aluminoferrate, tricalcium silicate, etc. Neither their presence in these forms, nor the presence of the small amounts of $Fe_2O_3$, $MgO$ and $SO_3$, are detrimental in the composition of the present invention.

Thus a mixture of from 70 to 99.25% Portland cement, 0.25 to 10% sodium bicarbonate and 0.5 to 20% talc provides all the components for the composition of the present invention. A preferred embodiment of the invention comprises 90 to 99.25% Portland cement, 0.25 to 3% sodium bicarbonate (baking soda) and 0.5 to 5% talc. A most preferred embodiment of the composition of the present invention is made by combining 98% Type I Portland cement, 0.75% baking soda and 1.25% talcum powder. To avoid abrasiveness, the cement used is preferably one that will pass through a standard test sieve with openings of about 88 microns on each side.

The preferred method of cleaning chrome using the present invention comprises the steps of dampening the powdered composition with water and rubbing the dampened composition on the metal to be cleaned. One preferred method is to sprinkle the powder on a damp cloth and then use the cloth to lightly rub the dampened composition on the metal.

Illustrative examples are provided to further describe the invention.

EXAMPLE 1

A powdered composition of the most preferred embodiment of the present invention was made by combining, under conditions of dryness, using simple mechanical mixing or stirring, the following:

| | |
|---|---|
| Type I Portland Cement | 98% |
| Baking Soda ($NaHCO_3$) | 0.75% |
| Talcum Powder ($Mg_3Si_4O_{10}(OH_2)$) | 1.25% |

The composition of Example 1 was wetted and gently rubbed on a chrome surface. The composition provided extremely fast and easy cleaning, leaving a most favorable smoothness and sheen to the chrome. A drop of 6 normal hydrochloric acid was placed on the surface thus cleaned and another surface cleaned with a conventional cleaner. After one minute the conventionally cleaned surface began to evidence pitting caused by the acid, whereas the surface cleaned with the composition of the present invention looked untouched.

Other powdered compositions of the present invention are given below in Examples 2-5. Each composition was mixed from reagent grade compounds using the same procedure as in Example 1.

EXAMPLE 2

| | |
|---|---|
| CaO | 71.25% |
| $SiO_2$ | 25% |
| $Al_2O_3$ | 3% |
| $NaHCO_3$ | 0.25% |
| $Mg_3Si_4O_{10}(OH_2)$ | 0.5% |

The appearance of the chrome surface cleaned with the composition of Example 2 was about the same as the surface cleaned by the composition of Example 1.

EXAMPLE 3

| | |
|---|---|
| CaO | 60% |
| $SiO_2$ | 17% |
| $Al_2O_3$ | 19% |
| $NaHCO_3$ | 1.0% |
| $Mg_3Si_4O_{10}$ | 3.0% | cleaning with the composition of Example 3 required more pressure in rubbing than the compositions of Examples 1 and 2, but produced approximately the same end result.

EXAMPLE 4

| | |
|---|---|
| CaO | 65% |
| $SiO_2$ | 25% |
| $Al_2O_3$ | 8% |
| $LiHCO_3$ | 0.75% |
| $Mg_3Si_4O_{10}(OH_2)$ | 1.25% |

The composition of Example 4 was more unstable than the previous example compositions, effervescing when wetted, and provided less relative protection to the surface cleaned.

EXAMPLE 5

| | |
|---|---|
| CaO | 60% |
| $SiO_2$ | 17% |
| $Al_2O_3$ | 19% |
| $NaHCO_3$ | 1.0% |
| $NaSiO_2$ | 3.0% |

The composition of Example 5 was also less stable than the first three example compositions, and appeared to give less chemical binding to the silicate layer.

Another example of a composition of the present invention is given below in Example 6.

EXAMPLE 6

| | |
|---|---|
| CaO | 65% |
| $SiO_2$ | 30% |
| $B_2O_3$ | 3% |
| $NaHCO_3$ | 0.75% |
| $Mg_3Si_4O_{10}(OH_2)$ | 1.25% |

While the mechanism by which the present invention is not completely understood, one possible explanation is as follows.

As the composition is dampened, it produces an increasingly alkaline composition, primarily due to the presence of the group A and D materials as they proceed to hydrate. Upon rubbing, the surface of the invisible chromium oxide layer is exposed to a mild alkaline oxidation at the surface level. The cleaner contains group C compounds, such as aluminum oxide, which, upon the onset of hydration, begin to form a chemical gel which incorporates the aluminum oxides and other compounds such as those from group A. This heterogeneous gel mixture has many open sites or locations which can "coordinate" or capture other oxygen atoms which in turn may already be bound to wetted components of the cleaning powder mixture. This complex gel formation starts to capture the oxygen containing chromium surface film and the miscellaneous contaminants on the chromium surface which, over time, have deposited and pitted on the chrome as discoloration and physical damage.

The oxides and oxygen atoms of these contaminants are captured and bound into the mass of the cleaning mixture gel. Progressively and with rubbing of a very, very mild nature, the contamination is chemically bound and removed into the hydrating gel mass which is on the cleaning cloth. Sequentially as oxygens of the silicate materials enter the oxygen-lacking chromium surface sphere of coordination, silicates and their oligomeric forms become selectively and chemically (i.e. covalently) bound to the chromium, forming a passivated, ceramic-like silicate layer on the chrome.

An exceptional blocking reaction simultaneously occurs whereby metal ions from Group E selectively tie up any still "available" silicate sites that are now metal-bound, thus blocking the bridging of these chromium bound silicates into the hydrating oxides and hydroxides of the gel. This metal ion blockage allows the chrome-bound silicates to be left out of the gel and to selectively and chemically form a thin, discrete ceramic-like layer on the chrome. Silicates not bound to the active chromium are taken up into the hydrating gel. Thus, only a thin silicate film remains.

The invention has been described in terms of a chrome cleaner. It will be recognized that the composition can be used to clean the surface of other metals. On steel and stainless steel, the deposition of a covalently bonded silicate layer is not as significant as on chrome due to the electrochemical potential of the ferrous alloys which are typically less reactive, and have a lower oxidation potential in base, than the naked, unoxidized chromium. This invention, however, is uncommonly effective in forming the hydration gel which captures contaminating oxides, salts, and scale off of stainless steel surfaces of interest. Similar cleaning action, albeit with a minimum of silicate deposition, can be shown on other alloys specifically involving copper, (brass, bronze, copper) whereby the hydrating gel removes contamination, although the lack of activity in the surface oxidation potential does not generally afford high amounts of covalent bonding of the silicate film.

The cleaning operation gives the appearance of an instant simultaneous cleansing brightening of the chrome surfaces. The oxygenophilic character of the reaction causes the simultaneous removal of traditionally unsightly oxides from underlying metal (rust and corrosion marks) with a simultaneous chemical bonding of silicates in a manner such that these pits and corrosion points from prior injury to the chromium surface becomes virtually unnoticed by virtue of the removal of discoloration.

From the foregoing it can be seen that a cosmetically and environmentally easy to apply compound has been developed which simultaneously and remarkably removes contamination while concomitantly bonding a coating of thin film silicates onto the metals of interest. The fact that this complex reaction can be done with surprisingly little rubbing, surprisingly mild environmental conditions, and exceptionally outstanding results in terms of long term protection provide key elements over all prior art.

Another advantage of the present invention is that contamination from a chipped or pitted ferrous metal under surfaces coated with chrome can be cleaned in such a manner that the chipped and pitted oxidation points are simultaneously cleaned, and a ceramic-like silicate is additionally bound to the ferrous metal subsurface in association with the chrome oversurface. The otherwise chipped, pitted, and oxidation-prone chromium surface and ferrous subsurface becomes generally protected, as a unit, from ongoing corrosion and the effects of acids and alkalies.

The ability to use non-reagent grade, commonly available compounds provides an additional advantage in that the composition of the preferred embodiment is relatively inexpensive. The fact that the composition is in powdered form makes it easy to mix and makes the product relatively light weight.

It is intended that the foregoing detailed description be regarded as illustrative rather than limiting, and that the following claims, including all equivalents, define the scope of the invention.

I claim:
1. A powdered composition comprising:
   (a) 70 to 99.25% Portland cement,
   (b) 0.25 to 10% of anhydrous carbonates or hydroxides of metals selected from Group 1A of the periodic table, and
   (c) 0.5 to 20% of silicates of magnesium.
2. A powdered composition comprising:
   (a) 70 to 99.25% Portland cement,
   (b) 0.25 to 10% sodium bicarbonate, and
   (c) 0.5 to 20% talc.
3. The composition of claim 2 comprising:
   (a) 90 to 99.25% Portland cement,
   (b) 0.25 to 3% sodium bicarbonate, and
   (c) 0.5 to 5% talc.
4. The composition of claim 3 comprising approximately:
   (a) 98% Portland cement,
   (b) 0.75% sodium bicarbonate, and
   (c) 1.25% talc.
5. The process of using the composition of claim 1 to clean metal.
6. The process of claim 5 further comprising the steps of:
   (a) dampening the powdered composition with water; and
   (b) rubbing the dampened composition on the metal to be cleaned.
7. The process of claim 5 wherein the metal cleaned comprises chrome.

* * * * *